May 13, 1947.    C. L. ORR ET AL    2,420,337
BRAKE BEAM SAFETY HANGER
Filed July 21, 1943    3 Sheets-Sheet 3
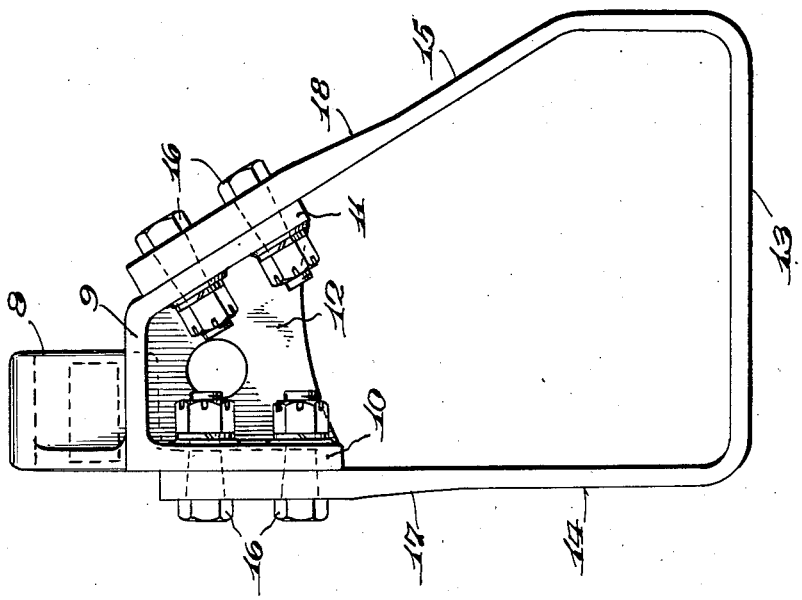
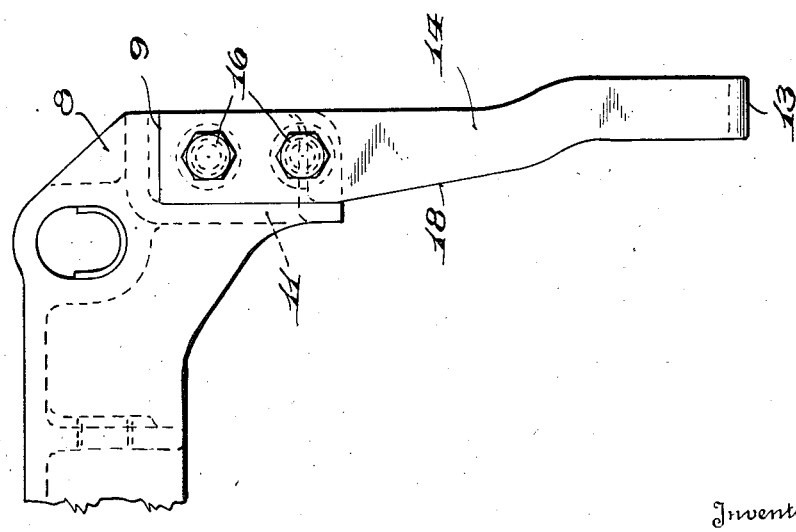
Inventors
Claude L. Orr,
Harry W. Stertzbach,
By Barry & Cyr
Attorneys Patented May 13, 1947

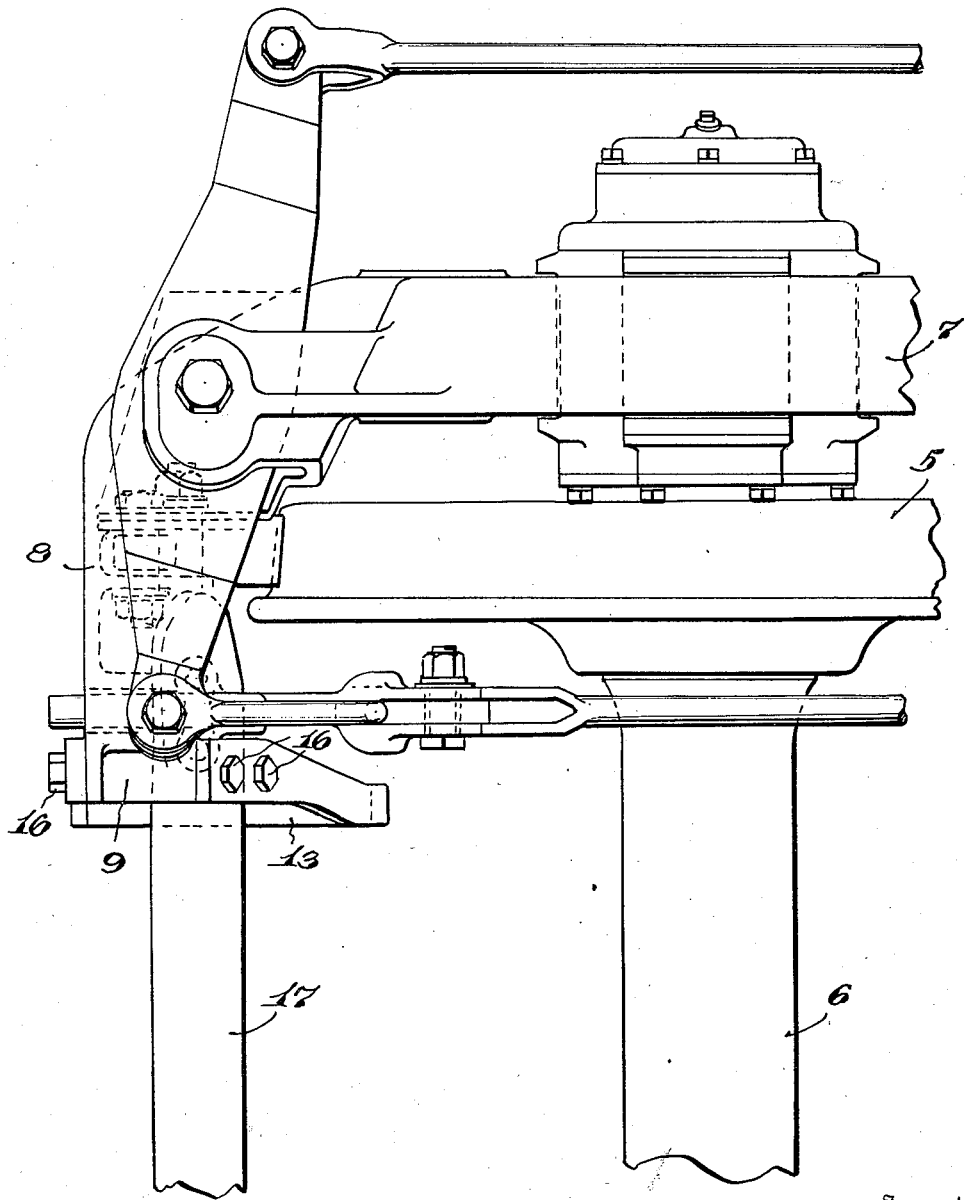

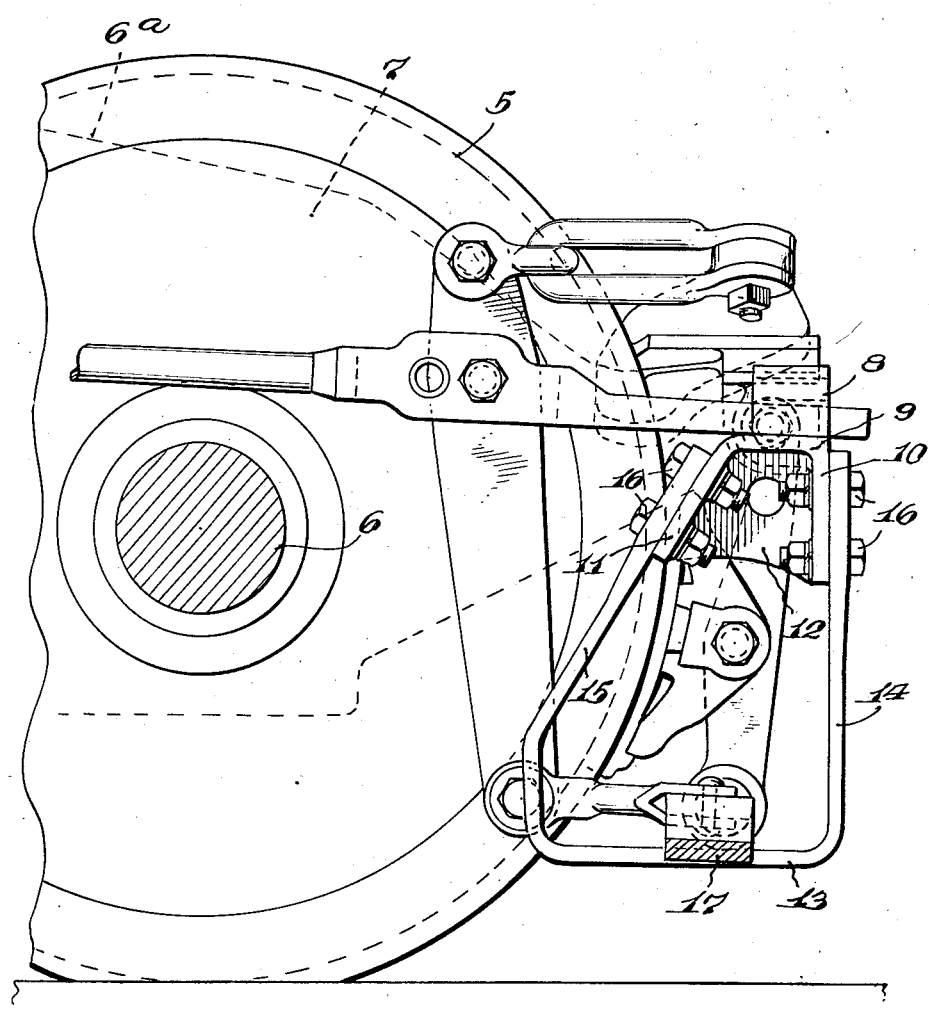

2,420,337

UNITED STATES PATENT OFFICE 2,420,337

BRAKE BEAM SAFETY HANGER

Claude L. Orr and Harry W. Stertzbach, Columbus, Ohio, assignors to The Buckeye Steel Castings Company, Columbus, Ohio Application July 21, 1943, Serial No. 495,650

11 Claims. (Cl. 188—210)

This invention relates to improvements in brake beam safety hangers and more particularly to those employed with the brake rigging of six and eight wheel railway car trucks.

In the past it has been the practice to support the safety hangers of the ends of the truck at about the level of the top of the brake hanger extensions of the side frame, which level is higher than the points of support for the intermediate safety hangers, and this made it necessary to employ longer safety hangers at the end positions than at the intermediate positions. Inertia forces incident to operation cause these longer end hangers to oscillate or vibrate, which sometimes resulted in the loosening of bolts or rivets used in securing them to the side frames, or even failure of the hanger straps near the point of application to the side frame due to bending stresses produced in the straps by the vibratory oscillations.

The primary object of the present invention is to eliminate such disadvantages and provide a simple, durable hanger structure which will be exceedingly effective for the purpose for which it is designed.

Briefly, our invention comprises a brake beam safety hanger in the form of a specially designed U-shaped strap having its upper ends secured to a specially shaped bracket arranged at a relatively low elevation on the truck side frame and adapted to substantially surround the brake beam without normally contacting the latter. Of course, its purpose is to keep the beam from falling on the rail in case of failure of a brake beam hanger.

The invention will be further explained in connection with the accompanying drawings, wherein:

Fig. 1 is a top plan view of a corner of a car truck with our improvements incorporated therein.

Fig. 2 is a vertical sectional view of the other corner at the same side of the truck.

Fig. 3 is a side view of a portion of the brake hanger extension and the safety hanger.

Fig. 4 is an end view of the same.

Referring to the drawings, 5 designates a wheel, 6 an axle, and 7 a side frame of a car truck. In accordance with the present invention the cast metal side frame has a brake hanger extension 8 which extends inwardly beyond the wheel toward the opposite side frame (not shown) and terminates in a bracket 9 positioned (Fig. 2) at about the same height as the axle 6 and considerably below the top 6a of the side frame. The bracket is preferably of inverted U-shape and has a vertical leg 10 and an inclined leg 11 reinforced by a vertical web 12 integral with them.

A U-shaped safety hanger 13 has a vertical arm 14 and an inclined arm 15, connected respectively to the vertical and inclined legs of the bracket by any suitable means such as bolts 16. The brake beam 17 extends through the hanger 13, which due to the low elevation of the bracket is materially shorter than the hangers heretofore used. This reduced length of hanger has a twofold effect: (a) it reduces the mass of the hanger which results in a proportional reduction of inertia forces acting upon it during operation of the truck; (b) it reduces the moment arm between the inertia forces and the point of application of the hanger to the bracket. Both of these effects reduce the bending stresses in the straps or arms, and the forces which tend to loosen the bolts or rivets 16. Bending stresses, which are maximum in a strap of uniform section at the point of its application to the frame, are further reduced by gradually increasing the thicknesses of the arms, as indicated at 18 in Figs. 3 and 4, so that the maximum thicknesses occur at the points of connection to the side frame where the bending moments are maximum. Bending stresses are also further reduced over those in previously used designs as the legs of the bracket at the points of maximum bending moments fall at straight portions of the hanger arms and the resulting stresses are not subject to increase due to curvature of the arms as in previous constructions.

In the preferred construction, initial looseness between the hanger and bracket, which tends to increase during operation, is eliminated by the use of tapered bolts, and reamed holes in the hanger and bracket, as shown in Fig. 4.

From the foregoing it is believed that the construction and advantages of our improvements will be fully understood and it will be apparent that changes may be made in the details disclosed without departing from the spirit of the invention, as expressed in the claims.

What we claim and desire to secure by Letters Patent is:

1. In a railway car truck, a side frame provided with a bracket positioned at about the same height as one of the axles of the truck and having divergent depending legs, a substantially U-shaped safety hanger having upwardly extending arms overlapping and secured to the legs, and a brake beam extending through the hanger.

2. In a railway car truck, a side frame provided with a bracket positioned at about the same height as one of the axles of the truck and having downwardly extending diverging legs, a substantially U-shaped safety hanger having a vertical arm and inclined arm overlapping and secured to the legs, and a brake beam extending through the hanger.

3. In a railway car truck, a side frame provided with a bracket positioned at about the same height as one of the axles of the truck and having depending diverging legs, a substantially U-shaped safety hanger having upwardly extending arms gradually increasing in thickness toward their upper end portions and overlapping said legs, means detachably securing the upper end portions of the arms to said legs, and a brake beam extending through the hanger.

4. In a railway car truck, a side frame provided at one of its ends with an inverted U-shaped bracket having legs, a substantially U-shaped safety hanger having upwardly converging arms overlapping said legs, means securing the legs to the arms, and a brake beam extending through the hanger.

5. In a railway car truck, a side frame provided with an inverted U-shaped bracket having relatively inclined legs, a substantially U-shaped safety hanger having relatively inclined arms which gradually increase in thickness toward the ends thereof and overlapping said legs, means securing the legs to the arms, and a brake beam extending through the hanger.

6. In a railway car truck, a cast metal side frame provided with an integral inverted U-shaped bracket having legs, a substantially U-shaped safety hanger having arms which converge toward one another and overlapping said legs, means securing the legs to the arms, and a brake beam extending through the hanger.

7. In a railway car truck, a side frame provided with a bracket having legs which diverge toward their ends, a substantially U-shaped safety hanger having arms which converge upwardly, means securing the legs to the arms, and a brake beam extending through the hanger.

8. In a railway car truck, a side frame provided at one of its ends with a bracket positioned at about the same height as one of the axles of the truck and having divergent depending legs, a substantially U-shaped safety hanger having upwardly extending arms overlapping said legs, means detachably securing the upper end portions of the arms to said legs, and a brake beam extending through the hanger.

9. In a railway car truck, a cast metal side frame provided at one of its ends with an extension arranged at an angle thereto and terminating in an inverted U-shaped bracket having divergent legs, a substantially U-shaped safety hanger having arms overlapping said legs, means rigidly securing the overlapping portions of the legs to the arms, and a brake beam extending through the hanger.

10. In a railway car truck, a side frame provided with a bracket having legs with plane outer surfaces, a substantially U-shaped safety hanger having arms with plane inner surfaces engaging the plane surfaces of said legs, tapered bolts rigidly securing the legs to the arms, and a brake beam extending through the hanger.

11. In a railway car truck, a side frame provided with a bracket positioned at about the same height as one of the axles of the truck and having legs which diverge toward their ends, a substantially U-shaped safety hanger having arms which converge upwardly and overlap said legs, means securing the legs to the arms, a web merging with said legs, and a brake beam extending through the hanger.

CLAUDE L. ORR.
HARRY W. STERTZBACH.

REFERENCES CITED

The following references are of record in the file of this patent:

UNITED STATES PATENTS

| Number | Name | Date |
| --- | --- | --- |
| 1,882,207 | Busse | Oct. 11, 1932 |
| 1,989,333 | Orr | Jan. 29, 1935 |
| 2,165,864 | Light | July 11, 1939 |